(12) United States Patent
Knettle et al.

(10) Patent No.: US 6,174,020 B1
(45) Date of Patent: Jan. 16, 2001

(54) SLIDING DOOR SYSTEM FOR VEHICLES

(75) Inventors: Kenneth D. Knettle, Lapeer; Richard Mirolla, deceased, late of Clarkston; by Joyce Prince, legal representative, Dearborn Heights; Neal G. Stupera, Fraser; Kurt H. Stroeters, Clawson; Timothy P. Lyon, Dearborn; Christine L. Alaniz, Ortonville; Richard A. Tabor, Sterling Heights; Michael De Clercq, Troy, all of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/211,729

(22) Filed: Dec. 15, 1998

(51) Int. Cl.[7] ............................................. B60J 5/06
(52) U.S. Cl. ............................ 296/155; 49/358; 49/362
(58) Field of Search .......................... 296/155; 49/27, 49/358, 360–362

(56) References Cited

U.S. PATENT DOCUMENTS

| | | | |
|---|---|---|---|
| 4,413,444 | * 11/1983 | Chikaraishi | 296/155 |
| 4,984,842 | * 1/1991 | Ogawa et al. | 296/155 |
| 4,991,905 | * 2/1991 | Watanabe et al. | 296/155 |
| 5,046,283 | 9/1991 | Compeau et al. | . |
| 5,316,365 | * 5/1994 | Kuhlman et al. | 296/155 |
| 5,322,339 | * 6/1994 | Dubernard | 296/155 |
| 5,524,960 | 6/1996 | Townsend et al. | . |
| 5,536,061 | * 7/1996 | Moore et al. | 49/358 |
| 5,577,795 | * 11/1996 | Shinsen | 296/155 |
| 5,581,944 | * 12/1996 | Kornbrekke et al. | 49/27 |
| 5,618,080 | * 4/1997 | Sullivan et al. | 296/155 |
| 5,895,089 | * 4/1999 | Sing et al. | 296/155 |
| 5,906,071 | * 5/1999 | Buchanan | 49/360 |
| 5,992,919 | * 11/1999 | Menke | 49/360 |
| 6,007,141 | * 12/1999 | Thomas et al. | 296/155 |

FOREIGN PATENT DOCUMENTS 0 173 829 A3   11/1986   (EP) .

* cited by examiner

Primary Examiner—Dennis H. Pedder
Assistant Examiner—Kiran Patel
(74) Attorney, Agent, or Firm—Roland A. Fuller, III

(57) ABSTRACT

A sliding door system for maintaining electrical communication between a sliding door and a vehicle body.

23 Claims, 4 Drawing Sheets

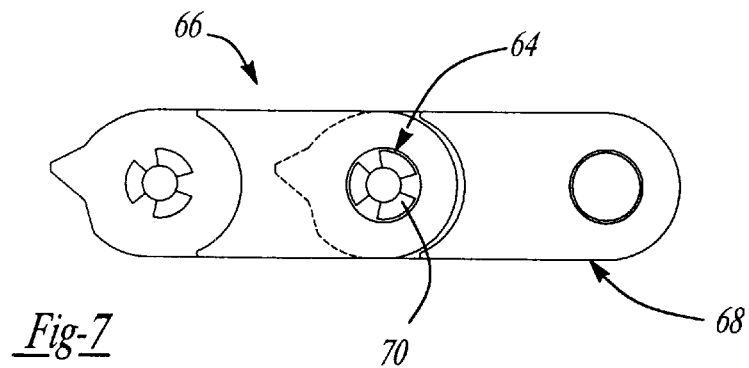
_Fig-7_
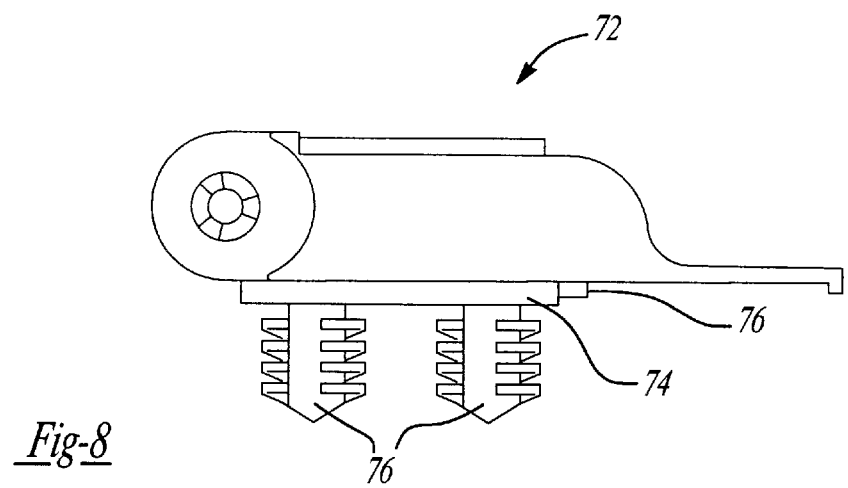
_Fig-8_
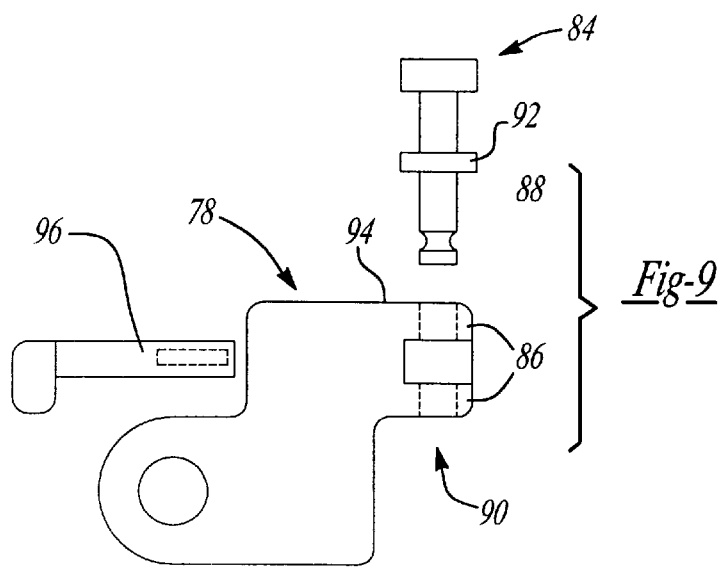
_Fig-9_

SLIDING DOOR SYSTEM FOR VEHICLES

FIELD OF THE INVENTION

This invention generally relates to a sliding door for a vehicle and, more particularly, to a connection that allows for an uninterrupted transfer of electrical power and signals between a vehicle body and the sliding door.

BACKGROUND AND SUMMARY OF THE INVENTION

While the background of this invention as discussed below is in the context of power sliding doors for vehicles, those of ordinary skill in the art will appreciate that the present invention has application well beyond that. Specifically, this invention would alleviate many of the problems commonly associated with electrically connecting a first member that slidably moves in a non-linear manner relative to a second member.

The imnmense popularity of vans, mini-vans and sport utility vehicles among consumers is readily apparent. The reasons are clear. Aside from the relative safety of larger vehicles when compared to small, they also allow for the comfortable transportation of families, including those with small children.

Common to both vans and mini-vans is the use of a rear sliding door rather than a pivoting door to access the rear cabin. Sliding doors are generally mounted on two or more guide tracks that are attached to a vehicle body for slidably moving between a closed, a released, and a fuill-open position. Sliding doors can thus provide a much larger area for the ingress and egress of passengers and other cargo from the rear cabin.

Sliding doors do present design challenges, however. For example, sliding doors are often heavier than their pivoting door counterparts. In addition, a sliding door's center of gravity will move rearward relative to the sliding door's support arrangement as the sliding door moves to a full-open position. As a result, moving a sliding door from a closed position outward and rearward to a released position, and then to a ftill-open position requires more strength than children, senior citizens and persons who are physically limited can muster. The same difficulties obtain when attempting to move the sliding door from a full-open position back to a closed position. Of course, when the vehicle is on hilly or uneven tenrain, the problems associated with opening and closing the sliding door will be magnified.

In light of the above, and in recognition of increasing consumer demand for greater convenience, power sliding doors for vehicles have been introduced into the marketplace. For example, in U.S. Pat. No. 5,046,283 to Compeau el al. the use of a motorized mechanism for moving a sliding door is disclosed. Specifically, Compeau et al. teaches using a drive mechanism mounted to the vehicle body to wind and unwind cables that are fixedly attached to the sliding door. Thus, when the mechanism drives in a first direction, the sliding door opens, and, when the mechanism drives in a second direction, the sliding door closes.

This invention, on the other hand, is directed to a system that uses a wire track assembly capable of providing continuous electrical power between the sliding door and vehicle body as opposed to merely linking a sliding door and vehicle body through mechanical means. Specifically, the wire track assembly can provide direct and uninterrupted electrical communication both to and from the sliding door and the vehicle body. As a result, electrical devices such as motors and sensors can be mounted on or in the sliding door.

The advantages of continuous electrical communication between the sliding door and vehicle body are apparent to those of ordinary skill in the art. For example, safety sensors may flow be placed on the vehicle sliding door at optimum sensing locations so that the sliding door's forward or rearward movement relative to the vehicle body may be stopped at any time during its travel between the full-open and closed positions, and back again. Or, rather than attaching a motorized driving mechanism for the sliding door to the vehicle body, the mechanism may instead be mounted directly on or in the sliding door.

Providing a continuous electrical link between a sliding door and a vehicle body also presents design challenges. In this regard, a vehicle sliding door generally has a first hinge and a second hinge, with the first hinge and the second hinge affixed to the lower forward corner and upper forward corner of the sliding door, respectively. Attached to the first and second hinges are guide rollers adapted for cooperation with a first guide track and a second guide track. The first and second guide tracks are in turn attached to the vehicle's body. The guide tracks commonly extend horizontally along the vehicle body, above and below the vehicle body's door opening.

When in a closed position, the vehicle sliding door sits in a generally flush position relative to the vehicle body. Consequently, when opening the sliding door, the sliding door's rear edge must first pivot outward and rearward relative to the vehicle body to a released position. Only then can the sliding door move in a generally horizontal direction on the guide tracks to its full-open position. Accordingly, the guide tracks are non-linear.

In other words, the vehicle sliding door must move through an arcuate path along the guide tracks from (1) a closed position where the sliding door is flush with a vehicle body; (2) to a released position where the rear edge of the sliding door relative to the vehicle body moves outward and rearward; (3) to a full-open position; and (4) back again. Of course, the integrity of the electrical connection between the sliding door and vehicle body has to be maintained notwithstanding the non-linear movement of the sliding door. This is the case even after a large number of duty cycles.

Accordingly, one object of this invention is to provide a new and improved sliding door system for vehicles wherein the sliding door and vehicle may be in continuous electrical communication with each other. Still another object of this invention is to provide a wire track assembly that operates in a reliable and efficient manncr to permit uninterrupted electrical communication between the sliding door and vehicle notwithstanding the non-linear path of the sliding door relative to the vehicle body even after a large number of duty cycles.

These and other features and advantages of the invention will be more fully understood from the following detailed description of the invention taken together with the accompanying drawings.

BRIEF DESCRIPTION OF THE DRAWINGS

FIG. 7 is an elevational view of a pair of main body links fittingly engaged;

FIG. 8 is an elevational view of a fixed end link of the wire track assembly in accordance with the present invention;

FIG. 9 is an elevational view of a driven end link of the wire track assembly in accordance with the present invention.

DETAILED DESCRIPTION OF THE INVENTION

Figure 1:
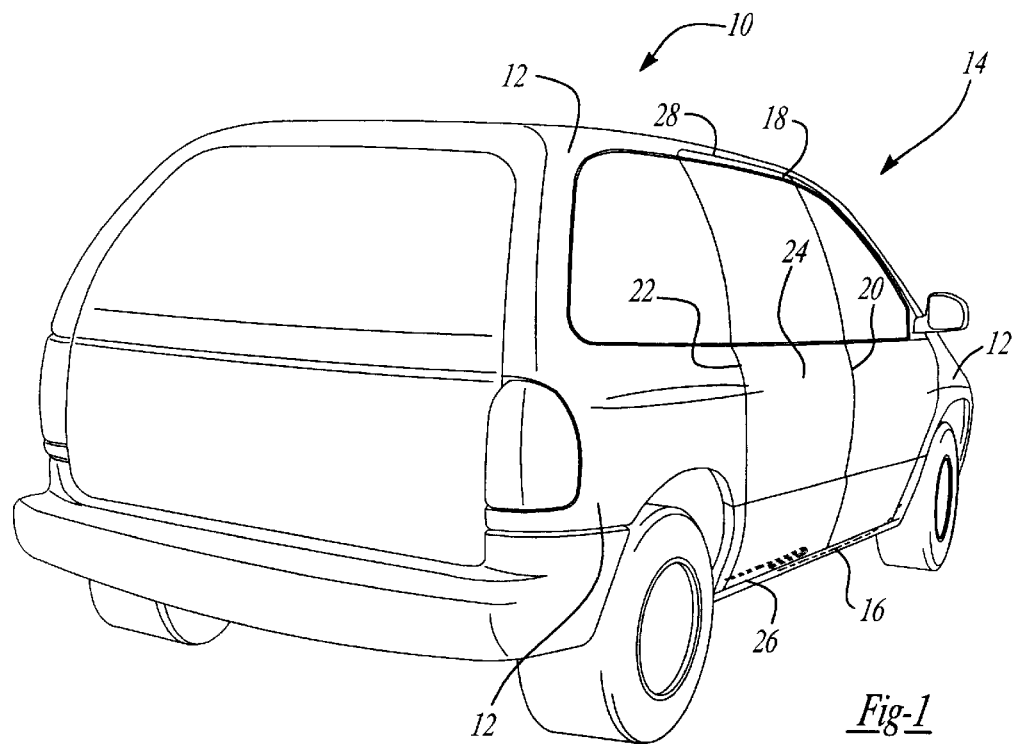
FIG. 1 is a perspective view of a vehicle with a sliding door system in accordance with the present invention with the sliding door shown in a closed position.
Figure 3:
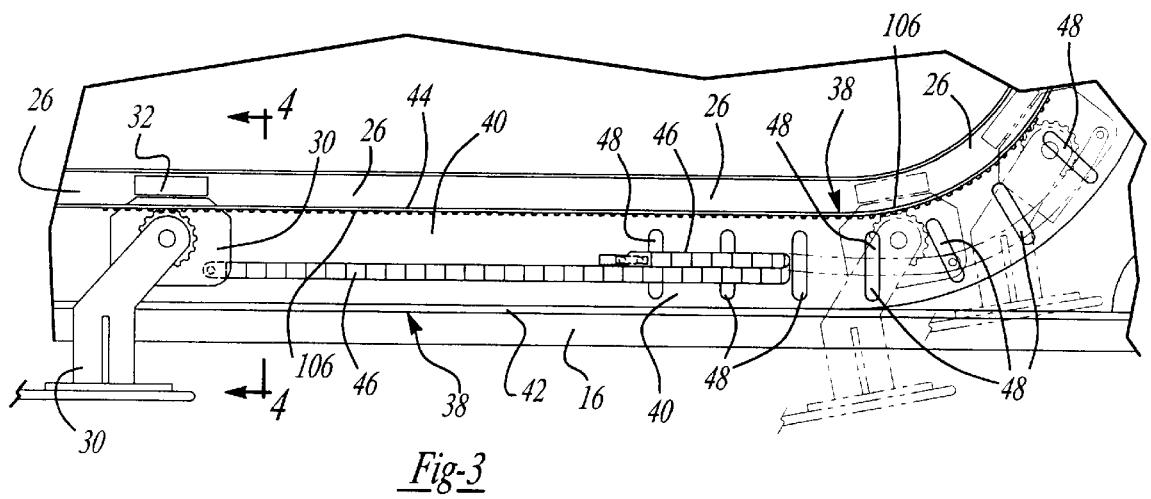
FIG. 3 is a top view of the door opening of the same embodiment of a powered sliding door system shown in FIG. 1 and FIG. 2.

One embodiment of the power sliding door system for vehicles according to this invention is shown in FIG. 1. A vehicle 10 has a vehicle body 12. The vehicle body 12 has an opening 14 defined by a first horizontal channel 16 and a second horizontal channel 18, and by a first body pillar 20 and a second body pillar 22. The opening 14 in vehicle body 12 is adapted for receiving a sliding door 24, with the sliding door 24 being slidably mounted on a first guide track 26 and a second guide track 28. As can be seen in FIG. 3, the first guLide track 26 is adjacent the first channel 16 of vehicle body 12 in this embodiment.

Figure 2:
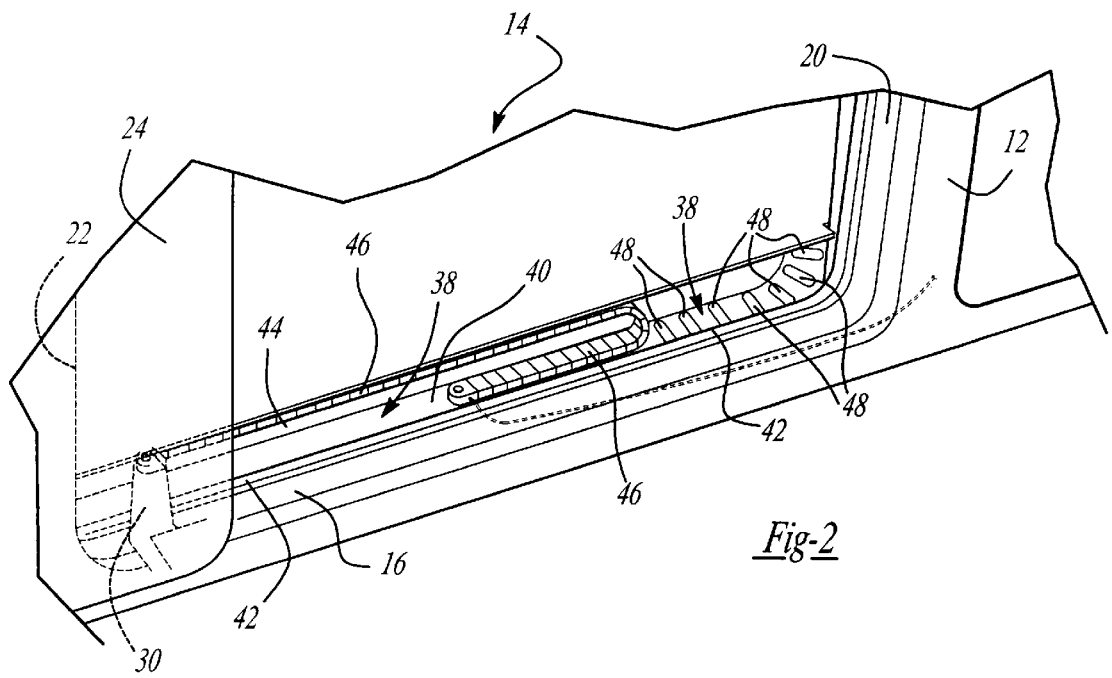
FIG. 2 is a partial view of a door opening of the same embodiment of the power sliding door system shown in FIG. 1 with the sliding door shown in a full-open position showing a wire track assembly.
Figure 10:
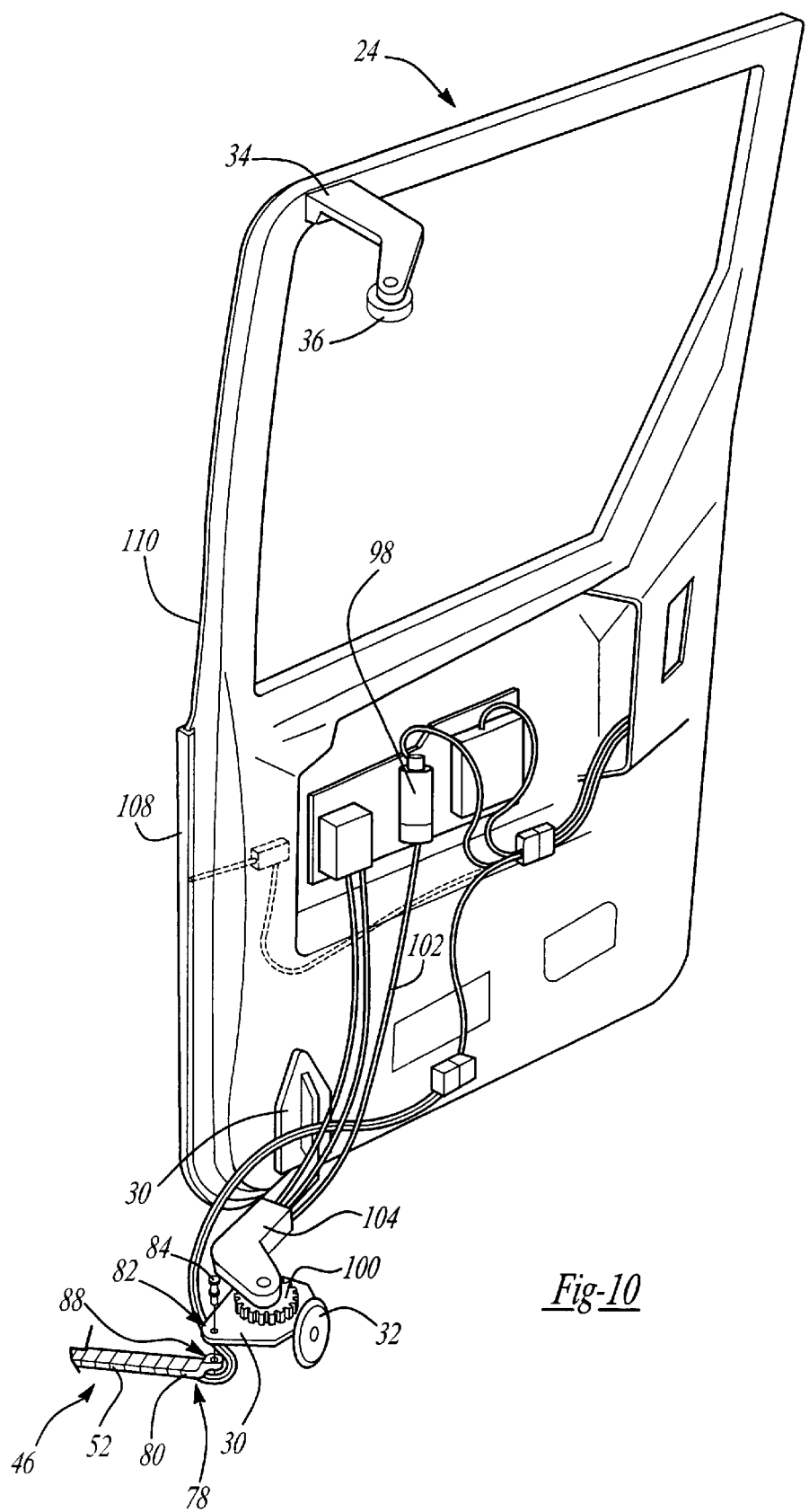
FIG. 10 is a perspective, partial sectional view of the inside of the sliding door in one embodiment of the present invention.

As is best shown in FIG. 10, the sliding door 24 has a first hinge 30 and a second hinge 34, with the first hinge 30 fixedly attached to the lower forward corner of the sliding door 24 relative to the front of the vehicle 10, and the second hinge 34 fixedly attached to the upper forward corner of the sliding door 24 relative to the front of the vehicle 10. Attached to the first hinge 30 and the second hinge 34 are a first guide roller 32 and a second guide roller 36, respectively. The first guide roller 32 is adapted for cooperation with the first puide track 26, and the second guide roller 36 is adapted for cooperation with the second guide track 28. Referring to FIG. 2 and FIG. 3, the first guide track 26 curves inward relative to the vehicle's 10 interior as it approaches first body pillar 20. This perits the sliding door 24 to sit in a generally flush position to the vehicle body 12 when the sliding door 24 is in a closed position as shown in FIG. 1.

As is best shown in FIG. 2 and FIG. 3, adjacent the first guide track 26 in the first channel 16 is a sill 38. The sill 38 is defined by a surface 40 between a first sidewall 42 and a second sidewall 44. The first sidewall 42 and the second sderwall 44 of the sill 38 generally follows the first guide track's 26 curved path. The sill 38 may therefore assist in guidiet a wire track assembly 46 when the slidinig door 24 moves from a closed, to a released, to a full-open position, and then back again.

Because the sill 38 in this embodiment may be exposed to elements like dust, dirt and water, the sill 38 has a plurality of formnations 48 oriented in a generally perpenidicular manner relative to the second sidewall 44. The formations 48 serve to minimize points of contact between the wire track assembly 46 and the surface 40 of the sill 38. The formations 48 thus reduce friction between the wire track assembly 46 and the surface 40, and also reduce the exposure of the wire track assembly 46 to undesirable conditions.

Figure 4:
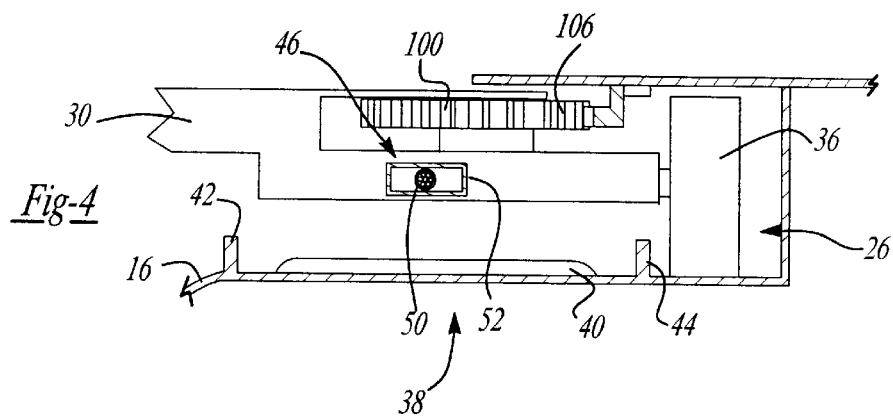
FIG. 4 is a cross-sectional view of the door opening shown in FIG. 3, the section being taken along line 4—4 of FIG. 3.

As shown in FIG. 4, the wire track assembly 46 between the vehicle body 12 and the sliding door 24 in this embodiment comprises a plurality of electrical wires 50 that are enclosed in a sheathing 52. The sheathing 52 is comprised of numerous main body links. One skilled in the art will appreciate that the number of main body links will vary in accordance with such variables as the desired length of the wirc track assembly 46.

Figure 5:
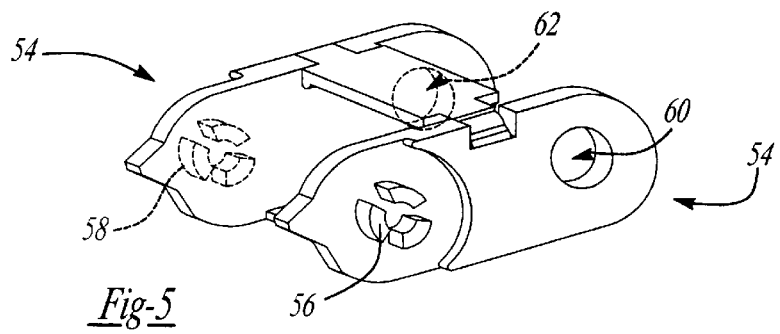
FIG. 5 is a perspective view of a main body link of the wire track assembly in accordance with the present invention.
Figure 6:
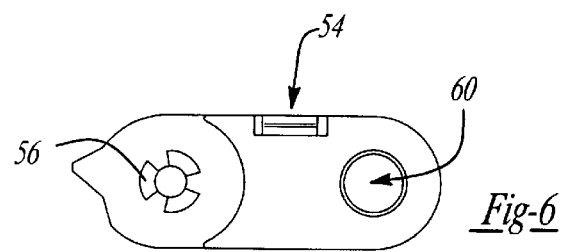
FIG. 6 is an elevational view of the main body link shown in FIG. 5.

A main body link 54 is shown in FIG. 5 and FIG. 6. As can be seen, a main body link 54 has a first round retaining wall 56 and a second round retaining wall 58 at a first end. In addition, the main body link 54 has a first elliptical aperture 60 and a second elliptical aperture 62 at a second end. As demonstrated in FIG. 7, the diameter of an elliptical aperture 64 of a main body link 66 are such that the elliptical aperture 64 of main body link 66 may fittingly engage a second main body link's 68 round retaining wall 70. In this embodiment, the shape and diameter of the elliptical aperture 64 of main body link 68 in relation to the second main body link's 68 round retaining wall 70 permits the sheathing 52 to bend transversely relative to the longitudinal axis of the wire track assembly 46. The transverse flexibility of the sheathing 52 when comprised of a plurality of main body links 54 helps the wire track assembly 46 negotiate the non-linear movement of the wire track assembly 46 as required by the non-linear movement of the sliding door 24.

At a first end of the wire track assembly 46 is a fixed end link 72 that is attached to the vehicle body 12 at sill 38. As shown in FIG. 8, the fixed end link 72 has a clip-slidc feature 74 adapted for receiving a fastener. In this embodiment, a double Christmas-Tree push fastener 76 is attached to the fixed end link 72 via the clip-slide feature 74. The fixed end link 72 may be fastened to the vehicle body 12 through holes located near the horizontal midpoint of surface 40 and the sill 38. Those of ordinary skill in the art will appreciate that there are numerous alternatives for fastening the wire track assembly 46 to the vehicle body 12. The method presented in this embodiment, however, positively mounts the fixed end link 72 to the vehicle body 12, and assists in maintaining the wire track assembly's 46 longitudinal orientation.

As indicated in FIG. 9 and FIG. 10, the wire track assembly 46 also has a driven end link 78 at a second end 80 that is attached to the first hinge 30 of the sliding door 24. The first hinge 30 has an slot 82 adapted for receiving an attachment stud 84. The driven end link 78 has a socket 86 having a first bore 88 and a second bore 90, also adapted for receiving the attachment stud 84. The attachment stud 84 has a shoulder 92 adapted to sit upon a first side 94 of the socket 86 that defines the first bore 88 of the driven end link 78. Thus, in attaching the wire track assembly 46 to the first hinge 30, the attachment stud 84 is driven through the slot 82 on the first hinge 30, as well as the first bore 88 and the second bore 90 of driven end link 78. The attachment stud 84 is then locked into place with a clip lock 96, adapted to fixedly engage the driven end link 78 and the attachment stud 84. Again, those of ordinary skill in the art will appreciate the variety of ways in which the wire track assembly 46 may be attached to the first hinge 30 of the sliding door 24. One of the advantages to this embodiment is that the attachment stud 84 allows for rotational movement of the driven end link 78 around the first hinge 30, thereby aiding in reducing torsion stress on the wire track assembly 46.

Finally, the advantages of electrical communication between the vehicle body 12 and the sliding door 24 in this embodiment are shown in FIG. 10. Wire track assembly 46, which houses electrical wires 50 is attached to the first hinge 30 of the sliding door 24. Attachment of the wire track assembly 46 to the first hinge 30 is effected via the driven end link 78, attachment stud 84, opening 82 in first hinge 30, and clip lock 96. Electrical wires 50 may be capable of providing uninterrupted electrical power and signals to and from the sliding door 24.

As a result, such things as a drive motor 98 can be mounted within the sliding door 24 to engage a power drive gear 100 through a drive cable 102. The power drive gear 100 is housed in a module 104 attached to the first hinge 30. When activated, the power drive gear 100 engages a rack 106 best shown in FIG. 4 and FIG. 5, thereby slidably moving the sliding door 24 relative to the vehicle body 12 through a plurality of positions. Alternatively, the drive motor 98, drive gear 100, and drive cable 102 may be removed providing a manual sliding door. In addition, an object detector 108 can be attached to an edge 110 of the sliding door 24.

While the above detailed description describes the preferred embodiment of the present invention, it will be understood that the present invention is susceptible to modification, variation and alteration without deviating from the scope and fair meaning of the subjoined claims.

What is claimed is:

1. A sliding door system for a vehicle, comprising:
   a vehicle body having an opening;
   at least one non-linear guide track attached to the vehicle body adjacent the opening;
   a sliding door slidably attached to the at least one non-linear guide track thereby permitting the sliding door to move along the at least one non-linear guide track in a non-linear path relative to the vehicle body; and
   a wire track assembly having electrical wires and a sheathing that receives and houses the electrical wires for electrically coupling the vehicle body and the sliding door, the sheathing capable of transversely bending relative to the longitudinal axis of the wire track assembly when the sliding door moves along the at least one non-linear guide track in a non-linear path relative to the vehicle body, wherein the wire track assembly accommodates power to the sliding door.

2. The sliding door system according to claim 1 wherein the opening in the vehicle body is defined by a first horizontal channel and a second horizontal channel and a first body pillar and a second body pillar.

3. The sliding door system according to claim 2 wherein the at least one non-linear guide track includes a first non-linear guide track adjacent to the first horizontal channel and a second non-linear guide track adjacent to the second horizontal channel.

4. The sliding door system according to claim 3 wherein the first non-linear guide track is adjacent to a sill, the sill being defined by a surface between a first sidewall and a second sidewall, wherein said first sidewall generally follows a curved path of the first guide track.

5. The sliding door system according to claim 4 wherein the surface of the sill has a plurality of formations generally perpendicular to the first sidewall.

6. The sliding door system according to claim 2 wherein the first horizontal channel defines a lower part of the opening relative to the vehicle body.

7. The sliding door system according to claim 1 wherein the sliding door has a first hinge and a second hinge, the first hinge attached to the lower forward corner of the sliding door relative to the vehicle's front end and the second hinge attached to the upper forward corner of the sliding door relative to the vehicle's front end, the first hinge having a first guide roller and the second hinge having a second guide roller, whereby the first guide roller is adapted for slidable cooperation with the first guide track and the second guide roller is adapted for slidable cooperation with the second guide track.

8. The sliding door system according to claim 1 wherein the sheathing for receiving and housing the electrical wires has a plurality of main body links, each maibn body link having a first round retaining wall and a second round retaining wall at a first end, and a first elliptical aperture and a second elliptical aperture at a second end, the first and the second elliptical apertures having a slightly larger diameter than the first and the second round retaining walls, whereby a main body link's first end can fittingly engage another main body link's second end and the sheathing can bend transversely relative to the longitudinal axis of the wire track assembly.

9. The sliding door system according to claim 8 wherein the sheathing consists of thirty-four main body links.

10. The sliding door system according to claim 8 wherein the sheathing has a first end and a second end, the first end having a fixed end link that includes a clip-slide feature adapted for receiving a double Christmas-Tree style push fastener for fixedly attaching the first end of the wire track assembly to the sill, and the second end having a driven end link adapted for rotatable attachment to the sliding door.

11. The sliding door system according to claim 10 wherein the sliding door includes a first hinge having a slot adapted for receiving an attachment stud, and the driven end link includes a socket having a first bore and a second bore also adapted for receiving the attachment stud, wherein the driven end link is rotatably attached to the first hinge by driving the attachment stud through the slot of the first hinge and through the first bore and the second bore of the socket of the driven end link.

12. The sliding door system according to claim 11 wherein the attachment stud is further secured to the driven end link with a clip lock.

13. A sliding door system for a vehicle, comprising:
   a vehicle body having an opening defined by a first horizontal channel and a second horizontal channel and a first body pillar and a second body pillar;
   a first curved guide track and a second curved guide track adjacent to the first horizontal channel and the second horizontal channel, respectively;
   a sliding door having a first hinge and a second hinge, the first hinge slidably attached to the first curved guide track and second hinge slidably attached to the second curved guide track, the first hinge being fixedly attached to the lower forward corner of the sliding door and the second hinge being fixedly attached to the upper forward corner of the sliding door relative to the front of the vehicle thereby permitting the sliding door to move along the first curved guide track and the second curved guide track in a non-linear path relative to the vehicle body; and
   a wire track assembly having electrical wires and a sheathing that receives and houses the electrical wires for electrically coupling the vehicle body and the sliding door, the sheathing capable of transversely bending relative to the longitudinal axis of the wire track assembly when the sliding door moves along the first curved guide track and the second curved guide track to accommodate the non-linear movement of the sliding door relative the vehicle body.

14. The sliding door system according to claim 13 wherein the sheathing has a plurality of main body links, each of the main body links having a first and a second round retaining wall at a first end and a first and a second elliptical aperture at a second end, the first and second elliptical apertures having a slightly larger diameter than the first and second round retaining walls, whereby a first main body link's first end can fittingly engage a second main body link's second end allowing the sheathing to bend transversely relative to the longitudinal axis of the wire track assembly.

15. The sliding door system according to claim 14 wherein the sheathing has a first end and a second end, the first end having a fixed end link that includes a clip-slide feature adapted for receiving a double Christmas-Tree style push fastener for fixedly attaching the first end of the wire track assembly to the first curved guide track, and the second end having a driven end link adapted for rotatable attachment to the sliding door.

16. The sliding door system according to claim 15 wherein the first hinge has a slot adapted for receiving an attachment stud, and the driven end link includes a socket having a first bore and a second bore, the first and second bores also adapted for receiving the attachment stud, whereby the driven end link is attached to the first hinge by driving the attachment stud through the slot of the first hinge and through the first bore and the second bore of the socket of the driven end link, with the attachment stud being further secured to the driven end link with a clip lock.

17. The sliding door system according to claim 13 wherein a motor attached to the sliding door adapted for displacing the sliding door between a plurality of positions on the guide tracks.

18. The sliding door system according to claim 17 wherein the motor attached to the sliding door is adapted to engage a power drive gear housed in a module attached to the first hinge through a drive cable, wherein the power drive gear engages a rack affixed to the vehicle body when activated thereby displacing the sliding door between a plurality of positions on the guide tracks.

19. A wire track assembly for providing continuous electrical power to a vehicle sliding door, the wire track assembly comprising:
 a sheathing adapted for receiving and housing electrical wires, the sheathing having a plurality of main body links, each main body link having a first round retaining wall and a second round retaining wall at a first end, and a first elliptical aperture and a second elliptical aperture at a second end, the first and second elliptical apertures having a slightly larger diameter than the first and second round retaining walls, whereby one main body link's first end can fittingly engage another main body link's second end;
 a fixed end link at the sheathing's first end, the fixed end link having a clip-slide feature adapted for receiving a double Christmas-Tree style push fastener for fixedly attaching a first end of the sheathing to a vehicle body; and a driven end link at the sheathing's second end, the driven end link being adapted for rotatable attachment to the sliding door.

20. The wire track assembly according to claim 19 wherein the driven end link includes a socket having a first bore and a second bore, the first and second bores adapted for receiving an attachment stud, whereby the driven end link is rotatable attached to the sliding door by driving the attachment stud through a slot in a first hinge of the sliding door and through the first bore and the second bore of the socket of the driven end link.

21. The sliding door system according to claim 1 wherein a motor attached to the sliding door adapted for displacing the sliding door between a plurality of positions on the guide tracks.

22. The sliding door system according to claim 1 wherein said door is opened and closed manually.

23. The wire track assembly according to claim 20 wherein the attachment stud is further secured to the driven end link with a clip lock.

* * * * *